(12) United States Patent
Tanaka et al.

(10) Patent No.: US 10,620,059 B2
(45) Date of Patent: Apr. 14, 2020

(54) TEMPERATURE SENSOR CIRCUIT

(71) Applicant: Kabushiki Kaisha Toshiba, Minato-ku, Tokyo (JP)

(72) Inventors: Masatomo Tanaka, Kanagawa (JP);
Hiroyuki Suwabe, Kanagawa (JP);
Tomoshige Abe, Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 16/013,143

(22) Filed: Jun. 20, 2018

(65) Prior Publication Data

US 2018/0299332 A1   Oct. 18, 2018

Related U.S. Application Data

(62) Division of application No. 14/846,316, filed on Sep. 4, 2015, now Pat. No. 10,024,727.

(30) Foreign Application Priority Data

Mar. 26, 2015   (JP) .................................. 2015-065086

(51) Int. Cl.
*G01K 7/01* (2006.01)
(52) U.S. Cl.
CPC ...................................... *G01K 7/01* (2013.01)
(58) Field of Classification Search
None
See application file for complete search history.

(56) References Cited

U.S. PATENT DOCUMENTS

| | | | |
|---|---|---|---|
| 6,082,177 A | 7/2000 | Niazy et al. | |
| 6,831,626 B2 | 12/2004 | Nakamura et al. | |
| 7,581,882 B2 | 9/2009 | Noguchi | |
| 2004/0004992 A1 | 1/2004 | Aota et al. | |
| 2004/0102914 A1* | 5/2004 | More | G01K 3/14 702/99 |
| 2007/0171956 A1 | 7/2007 | Noguchi | |
| 2008/0054987 A1* | 3/2008 | Choi | G09G 3/3696 327/512 |

FOREIGN PATENT DOCUMENTS

| | | |
|---|---|---|
| JP | 2009-139130 A | 6/2009 |
| JP | 2010-203978 A | 9/2010 |

* cited by examiner

*Primary Examiner* — Erica S Lin
(74) *Attorney, Agent, or Firm* — White & Case LLP (57) ABSTRACT

The temperature sensor circuit includes a diode that is connected to a first potential at a cathode thereof. The temperature sensor circuit includes a voltage dividing circuit that is connected to an anode of the diode at a second end thereof and outputs a divided voltage. The temperature sensor circuit includes a second amplifying circuit that receives the first signal at a first input end thereof, receives the divided voltage at a second input end thereof, is connected to a first end of the voltage dividing circuit at an output end thereof and outputs a second signal so as to make the divided voltage equal to the first signal. The temperature sensor circuit includes a measuring circuit that calculates a voltage difference between the first signal and the second signal and outputs an output signal based on the result of the calculation.

9 Claims, 10 Drawing Sheets

TEMPERATURE SENSOR CIRCUIT

CROSS-REFERENCE TO RELATED APPLICATION

This application is a divisional of application Ser. No. 14/846,316, filed Sep. 4, 2015 and is based upon and claims the benefit of priority from the prior Japanese Patent Application No. 2015-065086, filed on Mar. 26, 2015, the entire contents of which are incorporated herein by reference.

BACKGROUND

Field

Embodiments described herein relate generally to a temperature sensor circuit.

Background Art

A conventional temperature sensor circuit generates an output voltage that has a temperature dependency with respect to a reference voltage. Temperature is determined from the gradient of the output voltage with respect to a temperature change and the voltage value.

For example, if the reference voltage is supplied from a common band gap reference (BGR) circuit, the reference voltage has a temperature dependency distortion.

If the reference voltage has a temperature dependency distortion, the conventional temperature sensor circuit has a problem in that the temperature dependency distortion of the reference voltage can affect the output voltage to cause an error of the temperature measurement.

DETAILED DESCRIPTION

A temperature sensor circuit according to an embodiment includes a reference voltage circuit that outputs a reference voltage. The temperature sensor circuit includes a first amplifying circuit that receives the reference voltage at a first input end thereof, feeds a first signal back to a second input end thereof and outputs the first signal in such a manner as to make the first signal equal to the reference voltage. The temperature sensor circuit includes a diode that is connected to a first potential at a cathode thereof. The temperature sensor circuit includes a voltage dividing circuit that is connected to an anode of the diode at a second end thereof and outputs a divided voltage. The temperature sensor circuit includes a second amplifying circuit that receives the first signal at a first input end thereof, receives the divided voltage at a second input end thereof, is connected to a first end of the voltage dividing circuit at an output end thereof and outputs a second signal so as to make the divided voltage equal to the first signal. The temperature sensor circuit includes a measuring circuit that calculates a voltage difference between the first signal and the second signal and outputs an output signal based on the result of the calculation.

In the following, embodiments will be described with reference to the drawings.

First Embodiment

Figure 1:
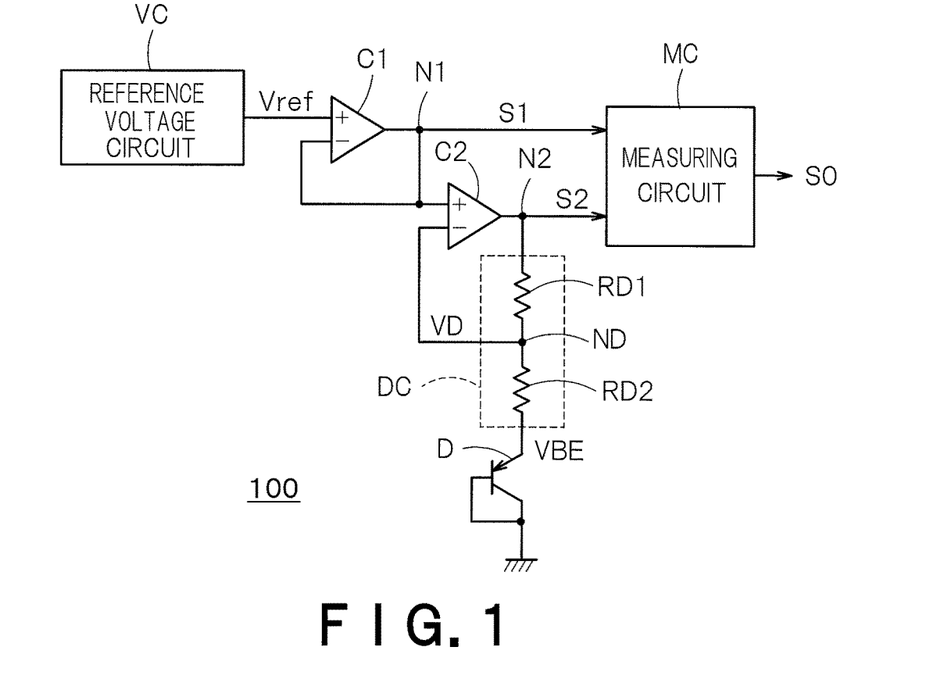
FIG. 1 is a diagram showing an example of a configuration of a temperature sensor circuit 100 according to a first embodiment.
Figure 2:
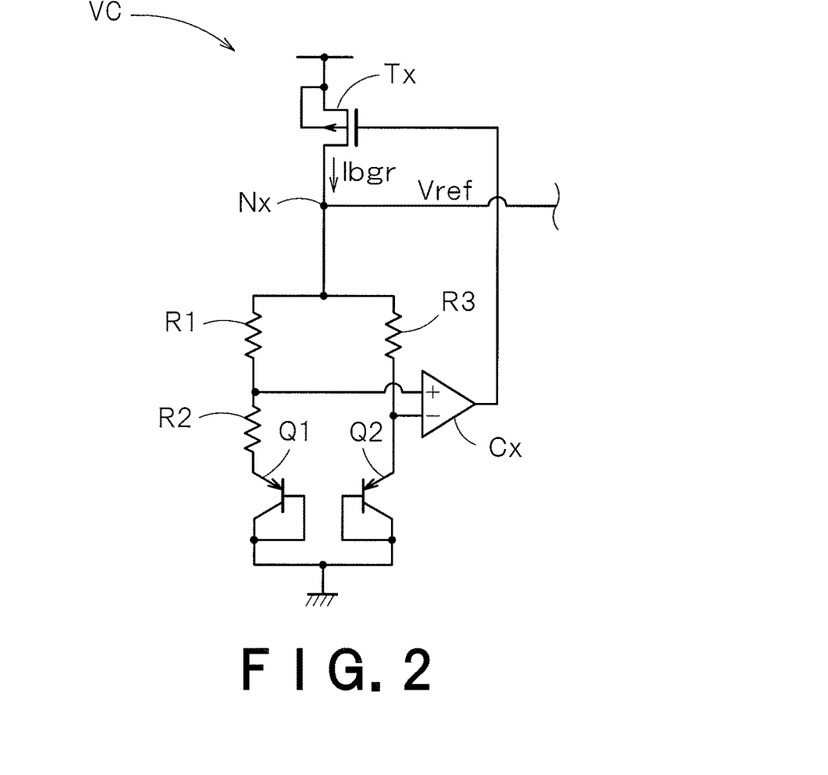
FIG. 2 is a circuit diagram showing an example of a configuration of a reference voltage circuit "VC" of the temperature sensor circuit 100 shown in FIG. 1.

FIG. 1 is a diagram showing an example of a configuration of a temperature sensor circuit 100 according to a first embodiment. FIG. 2 is a circuit diagram showing an example of a configuration of a reference voltage circuit "VC" of the temperature sensor circuit 100 shown in FIG. 1.

As shown in FIG. 1, the temperature sensor circuit 100 outputs an output signal "SO" that contains temperature information.

As shown in FIG. 1, the temperature sensor circuit 100 includes the reference voltage circuit (band gap reference (BGR) circuit) "VC", a first amplifying circuit "C1", a voltage dividing circuit "DC", a diode "D", a second amplifying circuit "C2", and a measuring circuit "MC", for example.

The reference voltage circuit "VC" outputs a reference voltage "Vref". The reference voltage circuit "VC" generates the reference voltage "Vref" based on a voltage that has a temperature dependency arising from a PN junction and outputs the reference voltage "Vref". That is, the reference voltage "Vref" has a temperature dependency distortion arising from a PN junction.

As shown in FIG. 2, the reference voltage circuit "VC" includes a reference transistor "Tx", a first reference resistor "R1", a second reference resistor "R2", a third reference resistor "R3", a first reference diode "Q1", a second reference diode "Q2", and a reference amplifying circuit "Cx", for example.

The reference transistor "Tx" is connected to a second potential (power supply potential) at one end of a current path thereof and to a reference node "Nx" at which the reference voltage "Vref" is output at another end of the current path.

In the example shown in FIG. 2, the reference transistor "Tx" is a MOS transistor that is connected to the second potential at a source thereof, to the reference node "Nx" at a drain thereof and to an output of the reference amplifying circuit "Cx" at a gate thereof. Alternatively, the reference transistor "Tx" may be a bipolar transistor.

The first reference resistor "R1" is connected to the reference node "Nx" at one end thereof.

The second reference resistor "R2" is connected to another end of the first reference resistor "R1" at one end thereof.

The third reference resistor "R3" is connected to the reference node "Nx" at one end thereof.

The first reference diode "Q1" is connected to another end of the second reference resistor "R2" at an anode thereof and to a first potential (ground potential) at a cathode thereof.

The second reference diode "Q2" is connected to another end of the third reference resistor "R3" at an anode thereof and to the first potential at a cathode thereof.

The first and second reference diodes "Q1" and "Q2" are diode-connected bipolar transistors (PNP-type bipolar transistors in the example shown in FIG. 2), for example. Alternatively, the first and second reference diodes "Q1" and "Q2" may be diode-connected MOS transistors or other semiconductor elements having a PN junction.

With such a configuration, the reference voltage "Vref" at the reference node "Nx" has a temperature dependency arising from the PN junctions of the first and second diodes "Q1" and "Q2".

A driving power (current density) of the first reference diode "Q1" is set to be lower than a driving power (current density) of the second reference diode "Q2". That is, for example, a size of the first reference diode "Q1" is smaller than a size of the second reference diode "Q2".

The reference amplifying circuit "Cx" is connected to the another end of the first reference resistor "R1" at a first input (non-inverting input terminal) thereof, to the another end of the third reference resistor "R3" at a second input (inverting input terminal) thereof and to the gate of the reference transistor "Tx" at an output thereof. The reference amplifying circuit "Cx" controls the reference transistor "Tx" so as to make the voltages at the first and second inputs equal to each other.

Since the reference transistor "Tx" is controlled by the reference amplifying circuit "Cx", the reference transistor "Tx" is controlled in accordance with a difference between the diodes "Q1" and "Q2" having comparable temperature dependency distortions. Therefore, the reference transistor "Tx" passes a reference current "Ibgr" that is controlled to reduce the influence of the temperature dependency distortions.

The reference voltage circuit "VC" outputs, at the reference node "Nx", the reference voltage "Vref" that is affected by the temperature dependency distortions arising from the PN junctions of the first and second reference diodes "Q1" and "Q2".

As shown in FIG. 1, the first amplifying circuit "C1" receives the reference voltage "Vref" at a first input (non-inverting input terminal) thereof, feeds an output thereof back to a second input (inverting input terminal) thereof, and outputs a first signal "S1" to the first node "N1". The first amplifying circuit "C1" controls the voltages at the first and second inputs to be equal to each other. That is, the first amplifying circuit "C1" controls the voltage at the first node "N1" (first voltage) to be equal to the reference voltage "Vref". Therefore, the first signal "S1" is a signal that is affected by the reference voltage "Vref" and has a temperature dependency distortion.

The voltage dividing circuit "DC" is connected to a second node "N2" at one end thereof and outputs a divided voltage "VD" obtained by dividing a second voltage at the second node "N2". As shown in FIG. 1, the voltage dividing circuit "DC" includes a first voltage dividing resistor "RD1" that is connected to the second node "N2" at one end thereof and to a voltage dividing node "ND" at which the divided voltage "VD" is output at another end thereof, and a second voltage dividing resistor "RD2" that is connected to the voltage dividing node "ND" at one end thereof and to an anode of the diode "D" at another end thereof, for example.

The diode "D" is connected to another end of the voltage dividing circuit "DC" at the anode thereof and to the first potential (ground potential) at a cathode thereof. The diode "D" is a diode-connected bipolar transistor (PNP-type bipolar transistor in the example shown in FIG. 1), for example. Alternatively, the diode "D" may be a diode-connected MOS transistor or other semiconductor elements having a PN junction. The second amplifying circuit "C2" receives the first voltage at the first node "N1" at a first input (non-inverting input terminal) thereof, receives the divided voltage "VD" at a second input (inverting input terminal) thereof and is connected to the second node "N2" at an output thereof. The second amplifying circuit "C2" controls the voltages at the first and second inputs to be equal to each other. That is, the second amplifying circuit "C2" outputs a second signal "S2" to the second node "N2" to make the divided voltage "VD" equal to the first voltage (first signal "S1"). Therefore, the second signal "S2" has a temperature dependency distortion of the reference voltage "Vref" arising from the first signal "S1", which is an input to the second amplifying circuit "C2", and a temperature gradient (temperature dependency) arising from the influence of the diode "D" whose input depends on the divided voltage "VD".

The measuring circuit "MC" receives the first signal "S1" and the second signal "S2" and outputs the output signal "SO". More specifically, the measuring circuit "MC" calculates the voltage difference between the first signal "S1" (first voltage) and the second signal "S2" (second voltage) and outputs the output signal "SO" that is based on the calculation result.

More specifically, the measuring circuit "MC" compares the result of the calculation of the potential difference between the first voltage at the first node "N1" and the second voltage at the second node "N2" with a prescribed relationship between temperature and the potential difference between the first voltage and the second voltage, thereby calculating a temperature that corresponds to the calculated potential difference. The measuring circuit "MC" then outputs the output signal "SO" containing information on the calculated temperature.

Next, characteristics of an operation of the temperature sensor circuit 100 configured as described above will be described.

Figure 3:
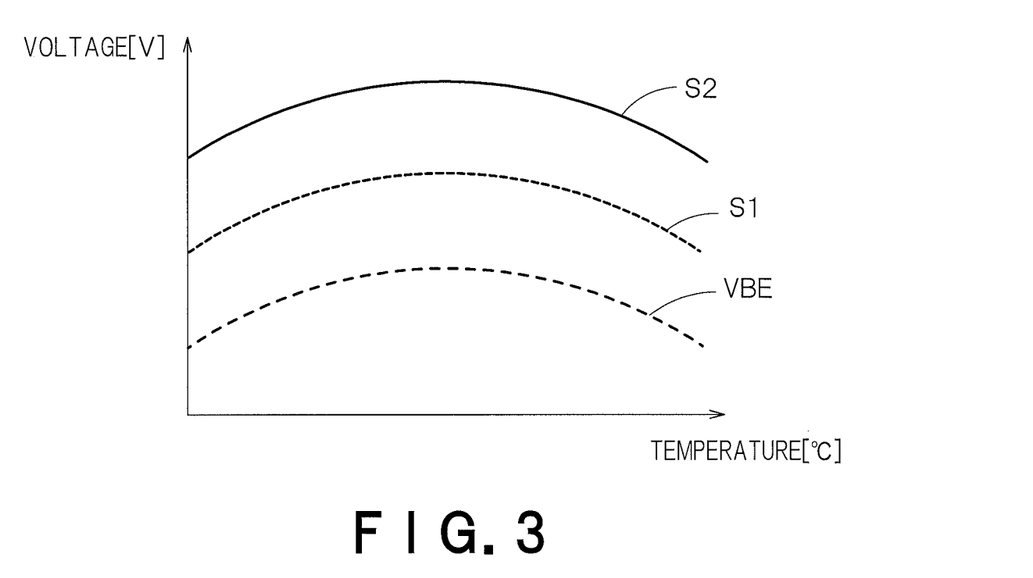
FIG. 3 is a diagram showing, in an emphasized manner, distortion components of a voltage "VBE" at the anode of the diode "D" (base-emitter voltage of the bipolar transistor), the first signal "S1" (first voltage) and the second signal "S2" (second voltage) in a case where the reference voltage "Vref" of the temperature sensor circuit 100 shown in FIG. 1 has a temperature dependency distortion.
Figure 4:
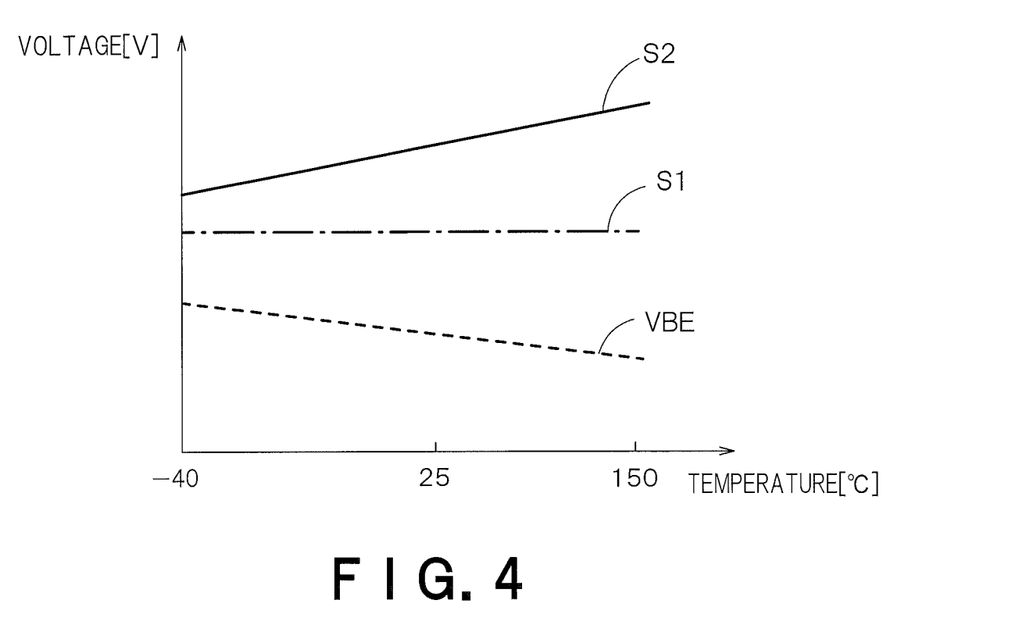
FIG. 4 is a diagram showing an example of a relationship between temperature and the voltage "VBE" at the anode of the diode "D", the first signal "S1" (first voltage) and the second signal "S2" (second voltage)
Figure 5:
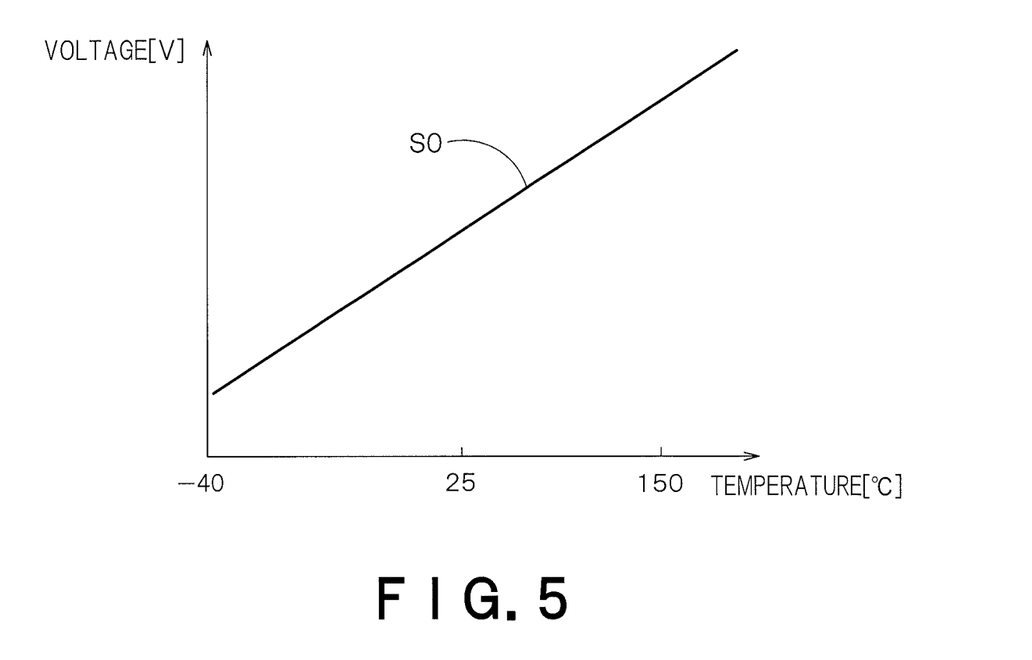
FIG. 5 is a diagram showing an example of a relationship between temperature and the output signal "SO" indicative of the difference between the second signal "S2" and the first signal "S1" shown in FIG. 4.

FIG. 3 is a diagram showing, in an emphasized manner, distortion components of a voltage "VBE" at the anode of the diode "D" (base-emitter voltage of the bipolar transistor), the first signal "S1" (first voltage) and the second signal "S2" (second voltage) in a case where the reference voltage "Vref" of the temperature sensor circuit 100 shown in FIG. 1 has a temperature dependency distortion. FIG. 4 is a diagram showing an example of a relationship between temperature and the voltage "VBE" at the anode of the diode "D", the first signal "S1" (first voltage) and the second signal "S2" (second voltage). FIG. 5 is a diagram showing an example of a relationship between temperature and the output signal "SO" indicative of the difference between the second signal "S2" and the first signal "S1" shown in FIG. 4.

Supposing that the first and second reference diodes "Q1" and "Q2" and the diode "D" are elements of the same type, as shown in FIG. 3, if the reference voltage "Vref" has a temperature dependency distortion, the voltages of the first and second signals (first and second voltages) "S1" and "S2" and the voltage "VBE" have a similar temperature dependency distortion (the voltages are not linear functions of temperature).

That is, the temperature dependency distortion of the reference voltage "Vref" is also input to the second amplifying circuit "C2" through the first amplifying circuit "C1". Since the anode voltage "VBE" of the diode "D" has the same temperature dependency as the reference voltage "Vref", the second signal "S2" also has the same temperature dependency distortion as the reference voltage "Vref".

The second amplifying circuit "C2" outputs the second signal "S2" to the second node "N2" so as to make the divided voltage "VD" equal to the first voltage (first signal "S1"). Therefore, as shown in FIG. 4, the second signal "S2" (second voltage) has such a temperature gradient as to increase as the temperature rises, while the voltage "VBE" (base-emitter voltage of the bipolar transistor serving as the diode "D") decreases as the temperature rises.

As described above, the measuring circuit "MC" measures the potential difference between the first voltage (first signal "S1") and the second voltage (second signal "S2"). Since both the first and second voltages have the temperature dependency distortion of the reference voltage "Vref", the temperature dependency distortion of the reference voltage "Vref" is cancelled in the potential difference. Furthermore, while the second signal "S2" is characterized by a temperature gradient, the first signal "S1" is not characterized by any temperature gradient. Thus, the potential difference approximates to a linear function for which the distortion in temperature is cancelled.

As shown in FIG. 5, the output signal "SO" is the difference between the second signal "S2" that is characterized by a temperature gradient and the first signal "S1" that is not characterized by any temperature gradient and is a linear function of temperature.

Thus, the influence of the temperature dependency distortion of the reference voltage "Vref" on the temperature corresponding to the measured potential difference is reduced, and the error of the temperature measurement can be reduced.

As described above, the temperature sensor circuit according to the first embodiment can reduce the error of the temperature measurement.

Second Embodiment

Figure 6:
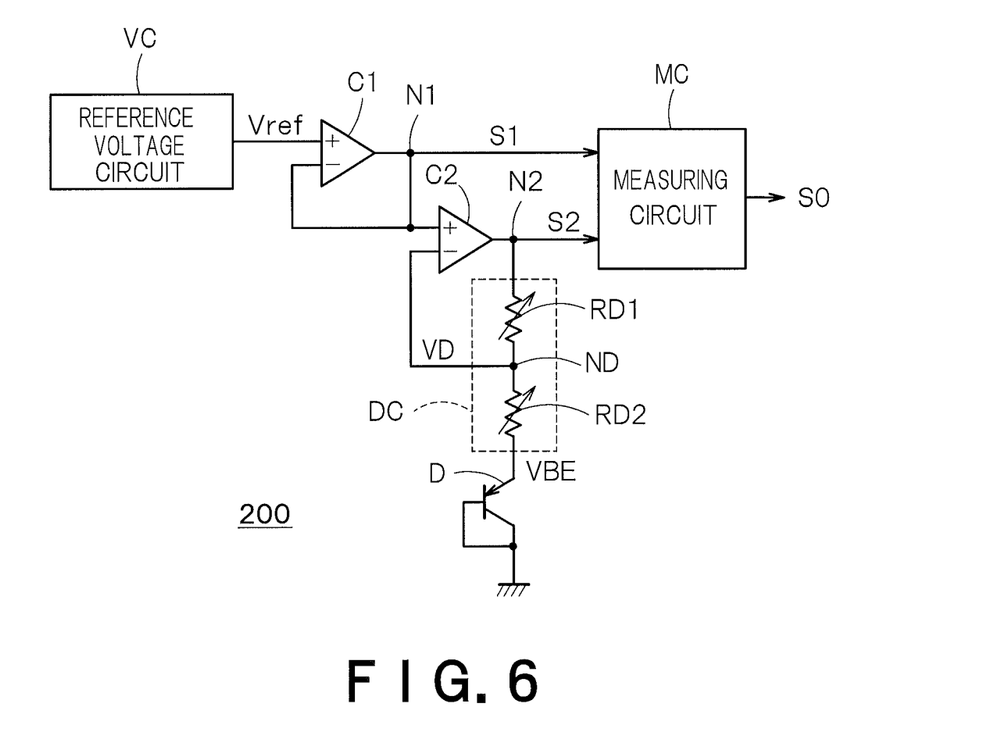
FIG. 6 is a circuit diagram showing an example of a configuration of a temperature sensor circuit 200 according to a second embodiment.

FIG. 6 is a circuit diagram showing an example of a configuration of a temperature sensor circuit 200 according to a second embodiment. In FIG. 6, the same reference symbols as those in FIG. 1 denote the same components as those in the first embodiment, and description of the components will be omitted.

As shown in FIG. 6, as with the temperature sensor circuit 100 according to the first embodiment, the temperature sensor circuit 200 includes the reference voltage circuit "VC", the first amplifying circuit "C1", the voltage dividing circuit "DC", the diode "D", the second amplifying circuit "C2", and the measuring circuit "MC".

The voltage dividing circuit "DC" is connected to the second node "N2" at one end thereof and outputs the divided voltage "VD" obtained by dividing the second voltage at the second node "N2".

As shown in FIG. 6, the voltage dividing circuit "DC" includes a first voltage dividing resistor "RD1" that is connected to the second node "N2" at one end thereof and to the voltage dividing node "ND" at which the divided voltage "VD" is output at another end thereof, and a second voltage dividing resistor "RD2" that is connected to the voltage dividing node "ND" at one end thereof and to the anode of the diode "D" at another end thereof, for example.

The first and second voltage dividing resistors "RD1" and "RD2" are variable resistors.

That is, according to the second embodiment, the voltage dividing ratio of the voltage dividing circuit "DC" that divides the second voltage and outputs the divided voltage "VD" can be changed.

The remainder of the configuration of the temperature sensor circuit 200 is the same as that of the temperature sensor circuit 100 shown in FIG. 1.

Figure 7:
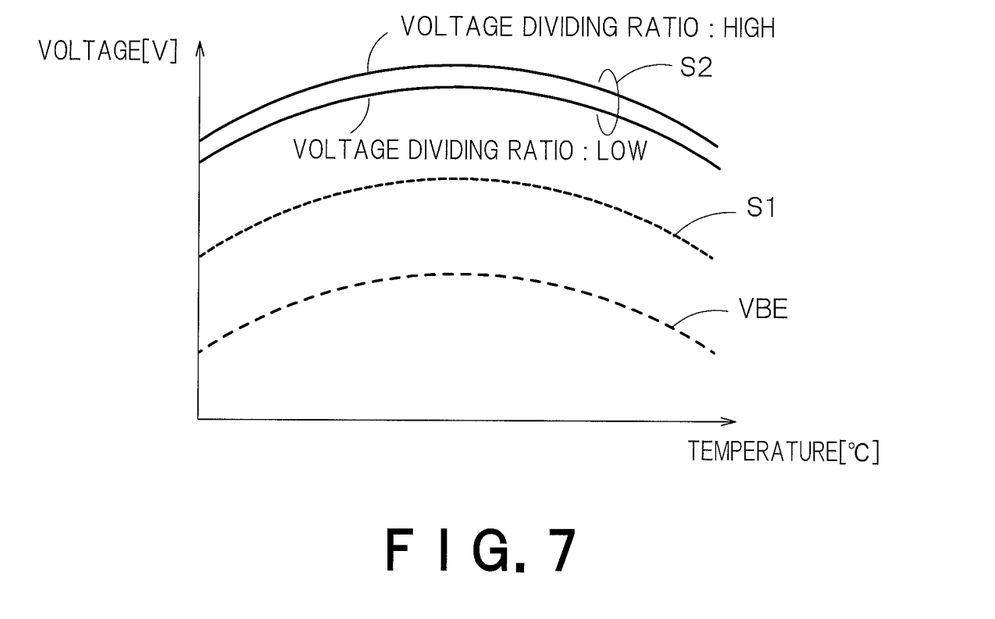
FIG. 7 is a diagram showing, in an emphasized manner, distortion components of the voltage "VBE" at the anode of the diode "D" (base-emitter voltage of the bipolar transistor), the first signal "S1" (first voltage) and the second signal "S2" (second voltage) in a case where the reference voltage "Vref" of the temperature sensor circuit 200 shown in FIG. 6 has a temperature dependency distortion.
Figure 8:
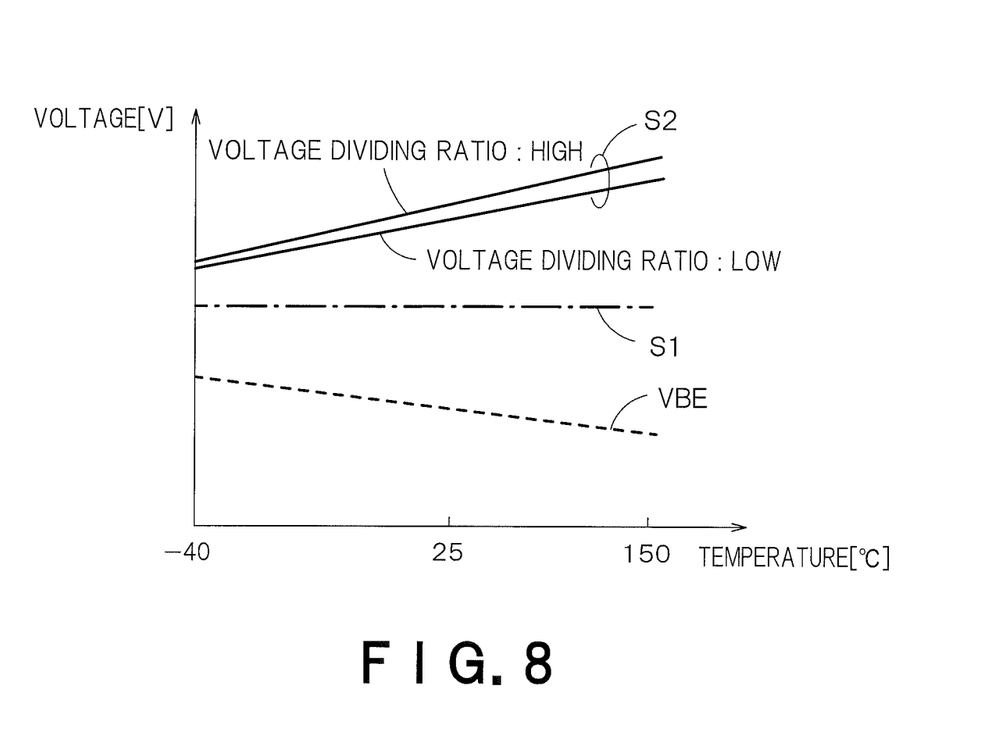
FIG. 8 is a diagram showing an example of a relationship between temperature and the voltage "VBE" at the anode of the diode "D", the first signal "S1" and the second signal "S2"

Next, characteristics of an operation of the temperature sensor circuit 200 configured as described above will be described. FIG. 7 is a diagram showing, in an emphasized manner, distortion components of the voltage "VBE" at the anode of the diode "D" (base-emitter voltage of the bipolar transistor), the first signal "S1" (first voltage) and the second signal "S2" (second voltage) in a case where the reference voltage "Vref" of the temperature sensor circuit 200 shown in FIG. 6 has a temperature dependency distortion. FIG. 8 is a diagram showing an example of a relationship between temperature and the voltage "VBE" at the anode of the diode "D", the first signal "S1" and the second signal "S2".

As shown in FIGS. 7 and 8, the influence of the temperature dependency of the anode voltage "VBE" of the diode "D" decreases as the voltage dividing ratio of the voltage dividing circuit "DC" decreases (for example, the resistance of the first voltage dividing resistor "RD1" decreases). On the other hand, the influence of the temperature dependency of the anode voltage "VBE" of the diode "D" increases as the voltage dividing ratio of the voltage dividing circuit "DC" increases (for example, the resistance of the first voltage dividing resistor "RD1" increases).

As shown in FIG. 8, the second signal "S2" can be adjusted by adjusting the voltage dividing ratio of the voltage dividing circuit "DC". That is, the magnitude of the potential difference between the first signal "S1" (first voltage) and the second signal "S2" (second voltage) input to the measuring circuit "MC" can be adjusted.

Therefore, the potential difference can be adjusted to the setting or resolution of a converter or the like of the measuring circuit "MC".

The remainder of the characteristics of the operation of the temperature sensor circuit 200 is the same as that of the temperature sensor circuit 100 according to the first embodiment.

That is, as with the temperature sensor circuit 100 according to the first embodiment, the temperature sensor circuit 200 according to the second embodiment can reduce the error of the temperature measurement.

Third Embodiment

Figure 9:
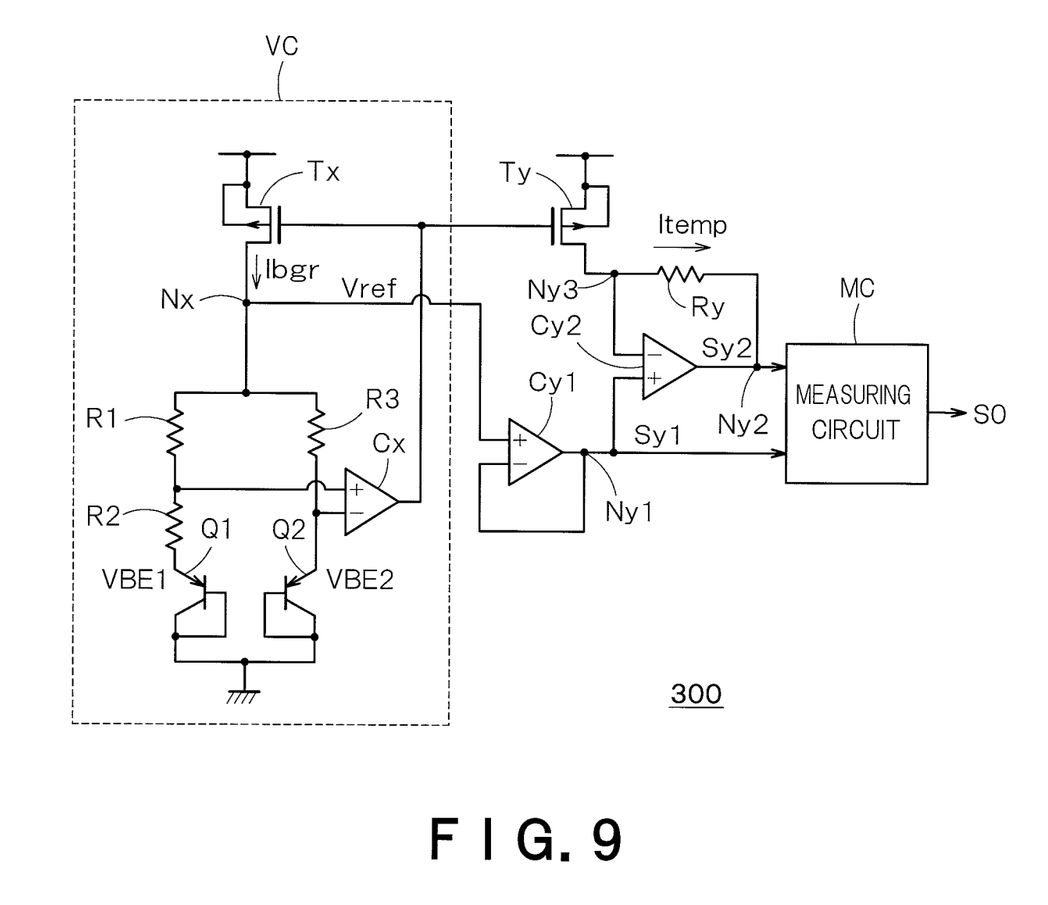
FIG. 9 is a circuit diagram showing an example of a configuration of a temperature sensor circuit 300 according to a third embodiment.

FIG. 9 is a circuit diagram showing an example of a configuration of a temperature sensor circuit 300 according to a third embodiment. In FIG. 9, the same reference symbols as those in FIG. 1 denote the same components as those in the first embodiment, and description of the components will be omitted.

As shown in FIG. 9, the temperature sensor circuit 300 outputs the output signal "SO" that contains temperature information.

As shown in FIG. 9, the temperature sensor circuit 300 includes the reference voltage circuit "VC", a first amplifying circuit "Cy1", a second amplifying circuit "Cy2", the measuring circuit "MC", a driving transistor "Ty", and a measuring resistor "Ry", for example.

The first amplifying circuit "Cy1" receives the reference voltage "Vref" at a first input (non-inverting input terminal) thereof, feeds an output thereof back to a second input (inverting input terminal) thereof, and outputs a first signal "Sy1" to a first node "Ny1". The first amplifying circuit "Cy1" controls the voltages at the first and second inputs to be equal to each other. That is, the first amplifying circuit "Cy1" controls the voltage at the first node "Ny1" (first voltage) to be equal to the reference voltage "Vref". Therefore, the first signal "Sy1" is a signal that is affected by the reference voltage "Vref" and has a temperature dependency distortion. As shown in FIG. 9, the driving transistor "Ty" is connected to the second potential (power supply potential) at one end of a current path thereof and to the gate of the reference transistor "Tx" at a gate thereof. That is, the driving transistor "Ty" and the reference transistor "Tx" form a current mirror circuit. The driving transistor "Ty" is controlled to pass a predetermined driving current. In the example shown in FIG. 9, the driving transistor "Ty" passes a driving current "Itemp" that is a mirror current of the reference current "Ibgr" flowing through the reference transistor "Tx".

As described above, since the reference current "Ibgr" of the reference voltage circuit "VC" is generated in accordance with the difference between the diodes "Q1" and "Q2" having comparable temperature dependency distortions, the influence of the temperature dependency distortions arising from the PN junctions is reduced. However, the diodes "Q1" and "Q2" have different driving powers (current densities), and therefore the difference therebetween has a temperature gradient. Thus, the reference current "Ibgr" is a current having a temperature gradient for which the temperature dependency distortion is reduced.

The driving transistor "Ty" passes the driving current "Itemp" that is a mirror current of (responsive to) the reference current "Ibgr". Therefore, the driving current "Itemp" is also a current having a temperature gradient for which the temperature dependency distortion is reduced.

In the example shown in FIG. 9, the driving transistor "Ty" is a MOS transistor that is connected to the second potential at a source thereof, to a third node "Ny3" (one end of the measuring resistor "Ry") at a drain thereof and to the gate of the reference transistor "Tx" at a gate thereof. Alternatively, the driving transistor "Ty" may be a bipolar transistor. The measuring resistor "Ry" is connected to the third node "Ny3" at one end thereof and to the second node "Ny2" at another end thereof.

The second amplifying circuit "Cy2" receives the first voltage at the first node "Ny1" at a first input (non-inverting input terminal) thereof, receives the voltage at the third node "Ny3" at a second input (inverting input terminal) thereof and is connected to the second node "Ny2" at an output thereof. The second amplifying circuit "Cy2" outputs a second signal "Sy2" to the second node "Ny2" to make the voltage at the third node "Ny3" equal to the first voltage.

That is, the second signal "Sy2" has the voltage of the first signal "Sy1" (first voltage) minus the voltage equal to the product of the driving current "Itemp" and the resistance of the measuring resistor "Ry". As described above, the first signal "Sy1" is a signal having a temperature dependency distortion that is affected by the reference voltage "Vref". Since the driving current "Itemp" is a current for which the temperature dependency distortion is reduced, the voltage equal to the product of the driving current "Itemp" and the resistance of the measuring resistor "Ry" has no temperature dependency distortion and has a temperature gradient. Therefore, the second signal "Sy2" is a signal that has a temperature gradient and has a temperature dependency distortion comparable to that of the first signal "Sy1".

The measuring circuit "MC" calculates the voltage difference between the first voltage at the first node "Ny1" and the second voltage at the second node "Ny2" and outputs the output signal "SO" based on the calculation result.

The remainder of the configuration of the temperature sensor circuit 300 is the same as that of the temperature sensor circuit 100 shown in FIG. 1.

Figure 10:
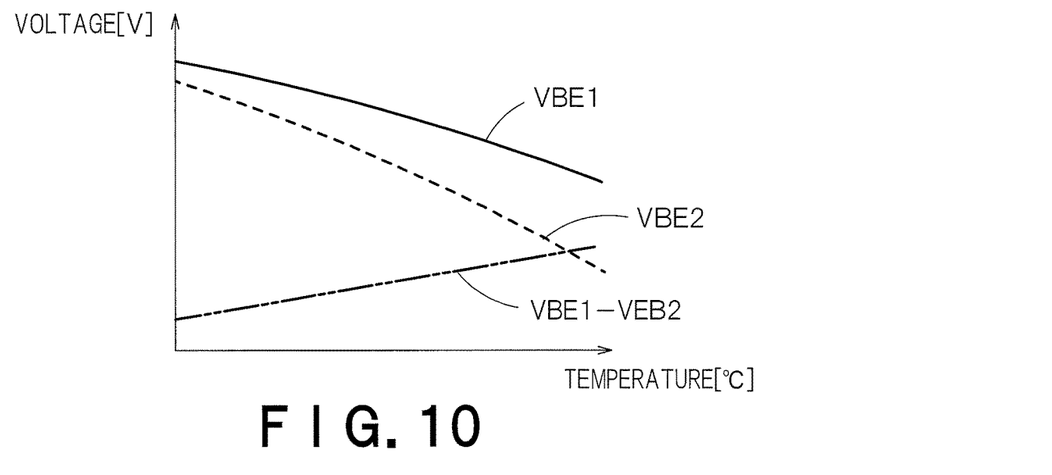
FIG. 10 is a diagram showing an example of a relationship between temperature and voltages "VBE1" and "VBE2" of the first and second reference diodes "Q1" and "Q2" and the potential difference "VBE1−VBE2" therebetween.
Figure 11:
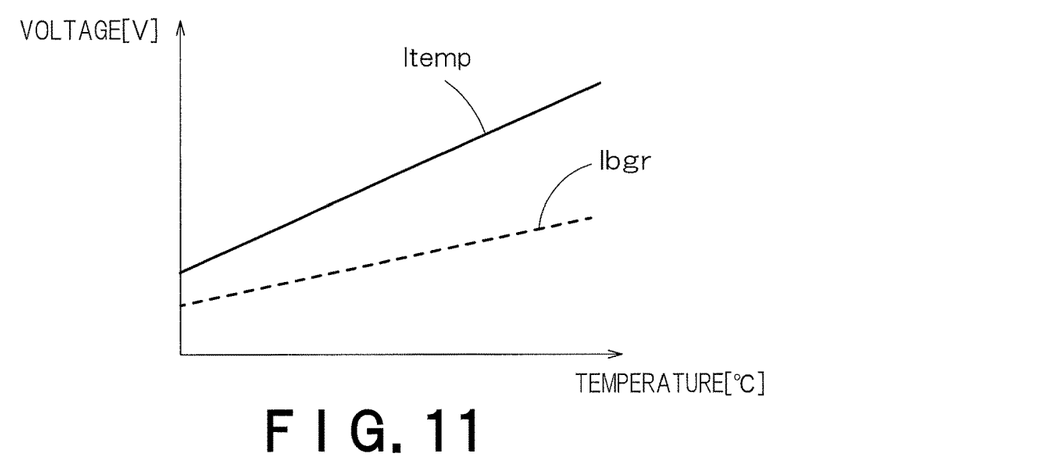
FIG. 11 is a diagram showing a relationship between temperature and the reference current "Ibgr" and the driving current "Itemp"
Figure 12:
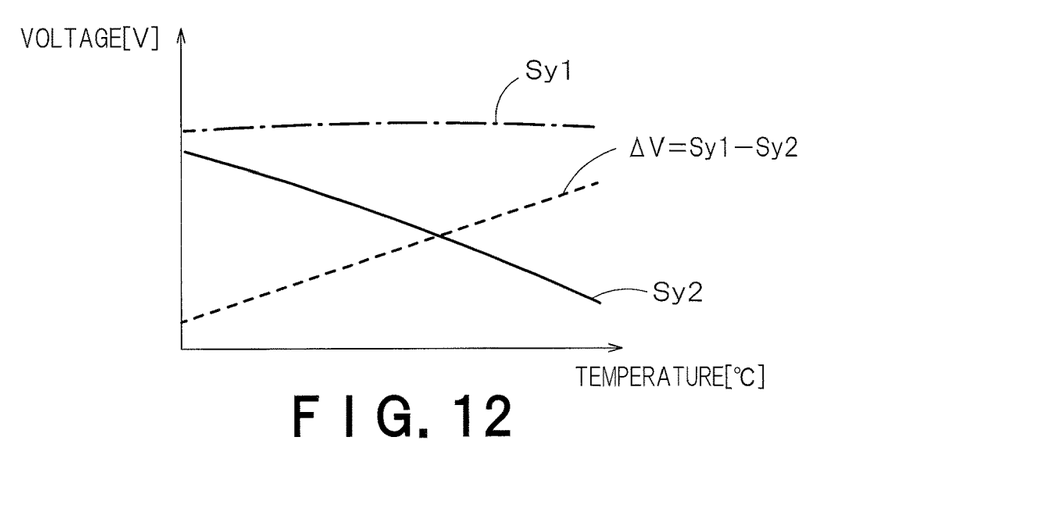
FIG. 12 is a diagram showing a relationship between temperature and the first signal "Sy1", the second signal "Sy2" and a potential difference "ΔV" therebetween.

FIG. 10 is a diagram showing an example of a relationship between temperature and voltages "VBE1" and "VBE2" of the first and second reference diodes "Q1" and "Q2" and the potential difference "VBE1–VBE2" therebetween. FIG. 11 is a diagram showing a relationship between temperature and the reference current "Ibgr" and the driving current "Itemp". FIG. 12 is a diagram showing a relationship between temperature and the first signal "Sy1", the second signal "Sy2" and a potential difference "ΔV" therebetween.

As shown in FIG. 10, the voltages "VBE1" and "VBE2", which are base-emitter voltages of the first and second reference diodes "Q1" and "Q2" having different emitter current densities, and the potential difference "VBE1–VBE2" therebetween have a temperature dependency. The voltages "VBE1" and "VB2" have comparable temperature characteristics, and therefore, the potential difference "VBE1–VBE2" has a small temperature dependency distortion.

Therefore, the reference current "Ibgr" and the driving current "Itemp" have little temperature dependency distortion and have a linearity (linear function characteristics) (see FIG. 11).

The first and second signals "Sy1" and "Sy2" have a temperature dependency distortion (that is, varies in a convex curve with temperature). The second signal "Sy2" is generated by I-V converting the driving current "Itemp" with respect to the first signal "Sy1". Therefore, the first signal "Sy1" and the second signal "Sy2" have comparable temperature dependency distortions.

Therefore, in the differential voltage "ΔV" between the first signal "Sy1" and the second signal "Sy2", the temperature dependency distortion is cancelled and reduced (see FIG. 12).

In this embodiment, the measuring circuit "MC" calculates the potential difference between the first voltage (first signal "Sy1") and the second voltage (second signal "Sy2"). As described above, in the potential difference, the temperature dependency distortion of the reference voltage "Vref" is cancelled. That is, the potential difference approximates to a linear function of the calculated temperature.

The measuring circuit "MC" compares the result of the calculation of the potential difference with a prescribed relationship between temperature and the potential difference between the first voltage and the second voltage, thereby calculating a temperature that corresponds to the calculated potential difference. The measuring circuit "MC" then outputs the output signal "SO" containing information on the calculated temperature.

Thus, the influence of the temperature dependency distortion of the reference voltage "Vref" in the temperature that corresponds to the calculated potential difference is reduced, and the error of the temperature measurement can be reduced.

That is, the temperature sensor circuit 300 according to the third embodiment can reduce the error of the temperature measurement.

Fourth Embodiment

Figure 13:
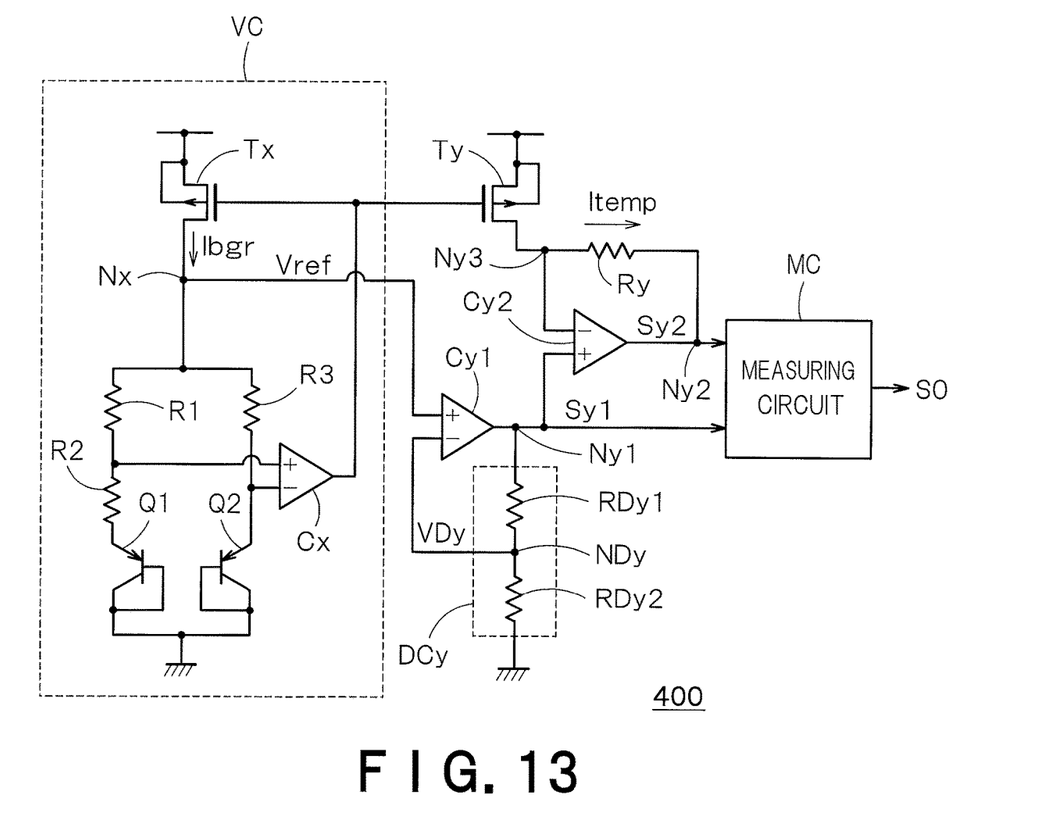
FIG. 13 is a circuit diagram showing an example of a configuration of a temperature sensor circuit 400 according to a fourth embodiment.

FIG. 13 is a circuit diagram showing an example of a configuration of a temperature sensor circuit 400 according to a fourth embodiment. In FIG. 13, the same reference symbols as those in FIG. 9 denote the same components as those in the third embodiment, and description of the components will be omitted.

As shown in FIG. 13, the temperature sensor circuit 400 outputs the output signal "SO" that contains temperature information.

As shown in FIG. 13, the temperature sensor circuit 400 includes the reference voltage circuit "VC", the first amplifying circuit "Cy1", the second amplifying circuit "Cy2", the measuring circuit "MC", the driving transistor "Ty", the measuring resistor "Ry", and a voltage dividing circuit "DCy", for example.

That is, the temperature sensor circuit 400 differs from the temperature sensor circuit 300 according to the third embodiment in that the temperature sensor circuit 400 further includes the voltage dividing circuit "DCy".

The voltage dividing circuit "DCy" is connected to the first node "Ny1" at one end thereof and to the first potential (ground potential) at another end thereof and outputs a divided voltage "VDy" (the third voltage) obtained by dividing the first voltage at the first node "Ny1".

The first amplifying circuit "Cy1" receives the reference voltage "Vref" at the first input (non-inverting input terminal) thereof, receives the divided voltage "VDy" at the second input (inverting input terminal) thereof and is connected to the first node "Ny1" at the output thereof. The first amplifying circuit "Cy1" outputs the first signal "Sy1" to the first node "Ny1" to make the divided voltage "VDy" equal to the reference voltage "Vref".

The voltage dividing circuit "DCy" allows the first voltage (first signal "Sy1") to be adjusted to a higher potential.

Figure 14:
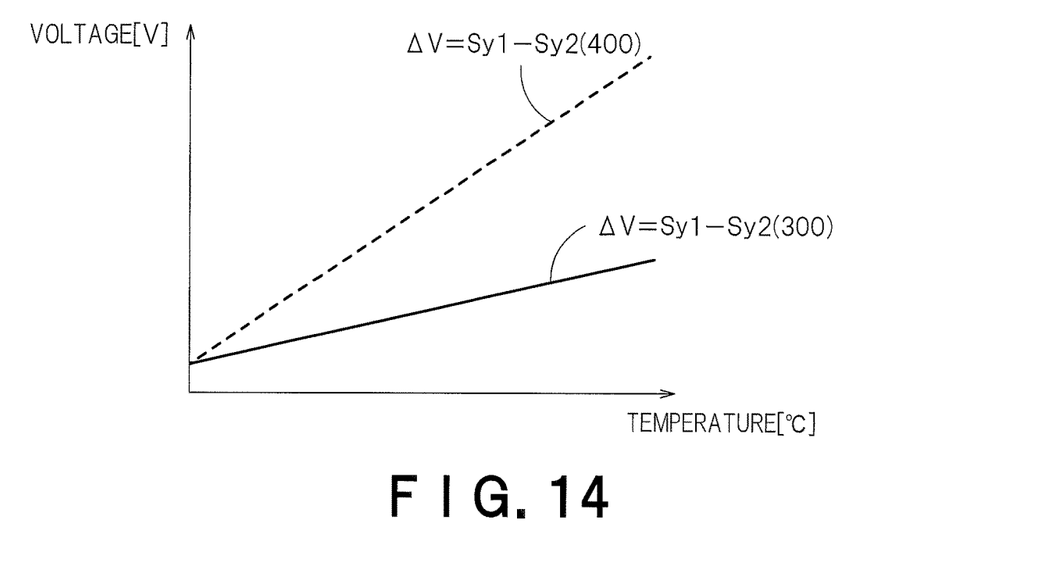
FIG. 14 is a diagram showing an example of a relationship between temperature and the potential differences "ΔV" of the temperature sensor circuits 300 and 400 according to the third and fourth embodiments.

FIG. 14 is a diagram showing an example of a relationship between temperature and the potential differences "ΔV" of the temperature sensor circuits 300 and 400 according to the third and fourth embodiments.

The gradient of the temperature dependency of the second signal "S2" can be increased by setting the first voltage (first signal "Sy1") at higher potentials.

Therefore, when the measuring circuit "MC" is constituted by an A/D converter, for example, the influence of the quantization error or conversion error of the A/D conversion can be reduced, and the precision of temperature detection can be improved.

The remainder of the configuration of the temperature sensor circuit 400 is the same as that of the temperature sensor circuit 300 shown in FIG. 9.

The operation of the temperature sensor circuit 400 configured as described above is the same as the operation of the temperature sensor circuit 300 according to the third embodiment.

That is, as with the temperature sensor circuit 300 according to the third embodiment, the temperature sensor circuit 400 according to the fourth embodiment can reduce the error of the temperature measurement.

Fifth Embodiment

Figure 15:
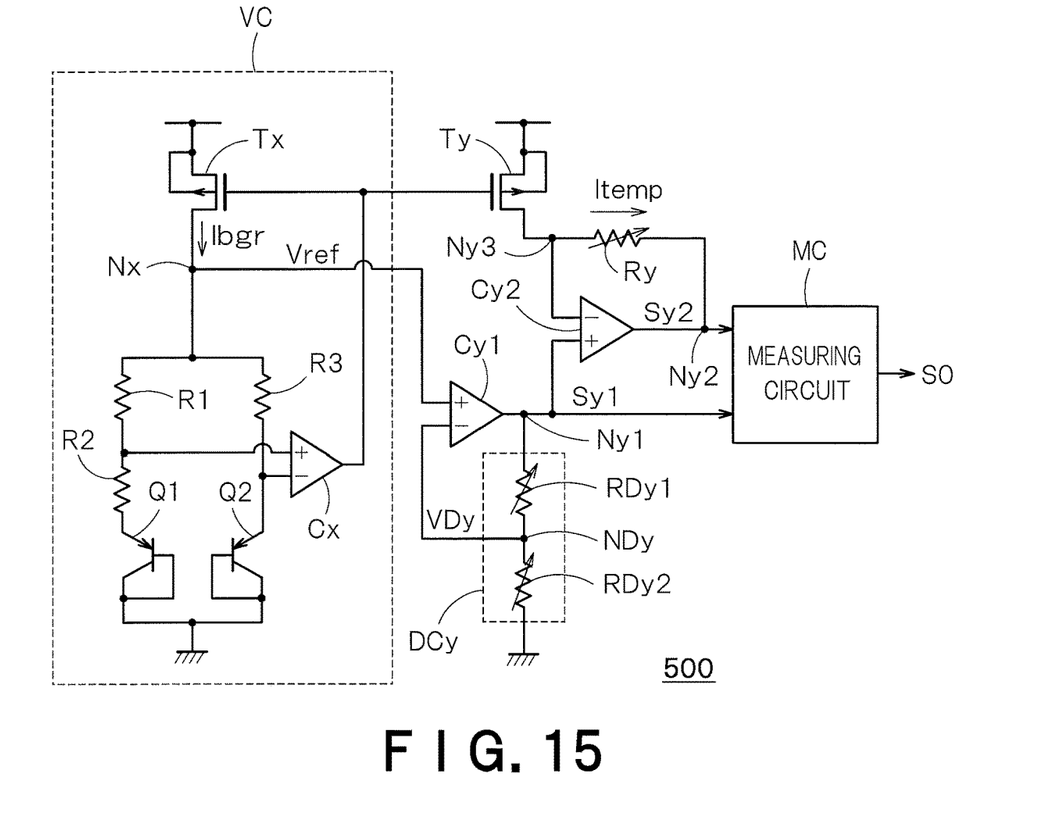
FIG. 15 is a circuit diagram showing an example of a configuration of a temperature sensor circuit 500 according to a fifth embodiment.

FIG. 15 is a circuit diagram showing an example of a configuration of a temperature sensor circuit 500 according to a fifth embodiment. In FIG. 15, the same reference symbols as those in FIG. 13 denote the same components as those in the fourth embodiment, and description of the components will be omitted.

As shown in FIG. 15, the temperature sensor circuit 500 outputs the output signal "SO" that contains temperature information.

As shown in FIG. 15, the temperature sensor circuit 500 includes the reference voltage circuit "VC", the first amplifying circuit "Cy1", the second amplifying circuit "Cy2", the measuring circuit "MC", the driving transistor "Ty", the measuring resistor "Ry", and the voltage dividing circuit "DCy", for example.

As in the fourth embodiment, the voltage dividing circuit "DCy" includes a first voltage dividing resistor "RDy1" that is connected to the first node "Ny1" at one end thereof and to the voltage dividing node "NDy" at which the divided voltage "VDy" is output at another end thereof, and a second voltage dividing resistor "RDy2" that is connected to the voltage dividing node "NDy" at one end thereof and to the first potential (ground potential) at another end thereof.

The first and second voltage dividing resistors "RDy1" and "RDy2" are variable resistors.

That is, according to the fifth embodiment, the voltage dividing ratio of the voltage dividing circuit "DCy" that divides the first voltage and outputs the divided voltage "VDy" can be changed.

Furthermore, according to the fifth embodiment, the measuring resistor "Ry" is also a variable resistor.

This allows the voltage of the first signal "Sy1" and the temperature characteristics of the second signal "Sy2" to be adjusted.

That is, depending on the conditions of the power supply voltage or the resolution of the converter, the first signal "Sy1" and the second signal "Sy2" can be optimally set. Note that adjustment of at least one of the variable resistors suffices.

Figure 16:
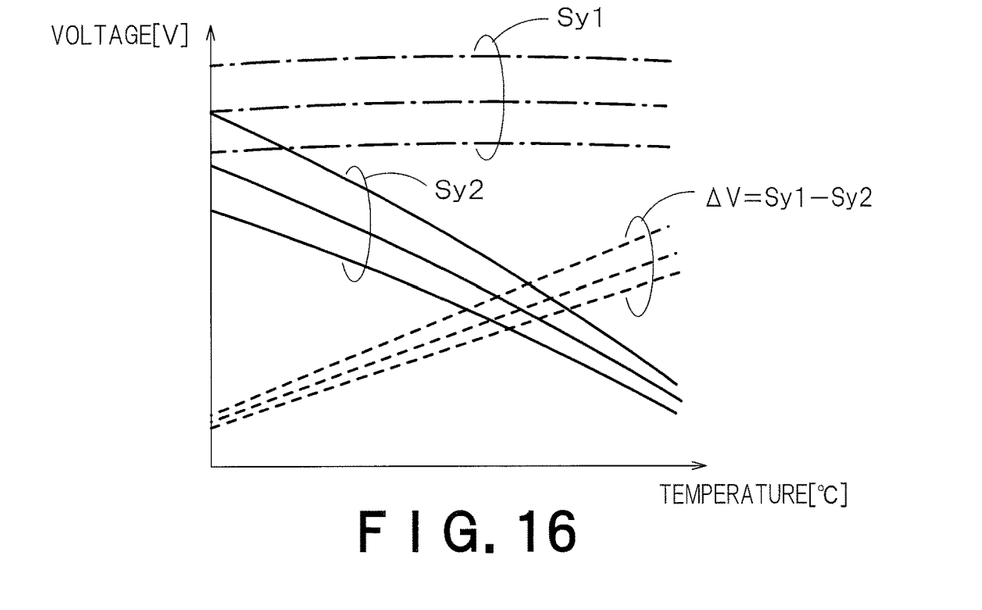
FIG. 16 is a diagram showing an example of a relationship between temperature and the first signal "Sy1", the second signal "Sy2" and the potential difference "ΔV" therebetween of the temperature sensor circuit 500 shown in FIG. 15.

FIG. 16 is a diagram showing an example of a relationship between temperature and the first signal "Sy1", the second signal "Sy2" and the potential difference "ΔV" therebetween of the temperature sensor circuit 500 shown in FIG. 15.

As shown in FIG. 16, if the resistance of the first voltage dividing resistor "RDy1" is adjusted, for example, the potential of the first signal "Sy1" is adjusted. If the resistance of the measuring resistor "Ry" is adjusted, the potential of the second signal "Sy2" is adjusted. As a result, the potential difference "ΔV" is adjusted.

The remainder of the configuration of the temperature sensor circuit 500 is the same as that of the temperature sensor circuit 400 shown in FIG. 13.

The operation of the temperature sensor circuit 500 configured as described above is the same as the operation of the temperature sensor circuit 400 according to the fourth embodiment.

That is, as with the temperature sensor circuit 400 according to the fourth embodiment, the temperature sensor circuit 500 according to the fifth embodiment can reduce the error of the temperature measurement.

Sixth Embodiment

Figure 17:
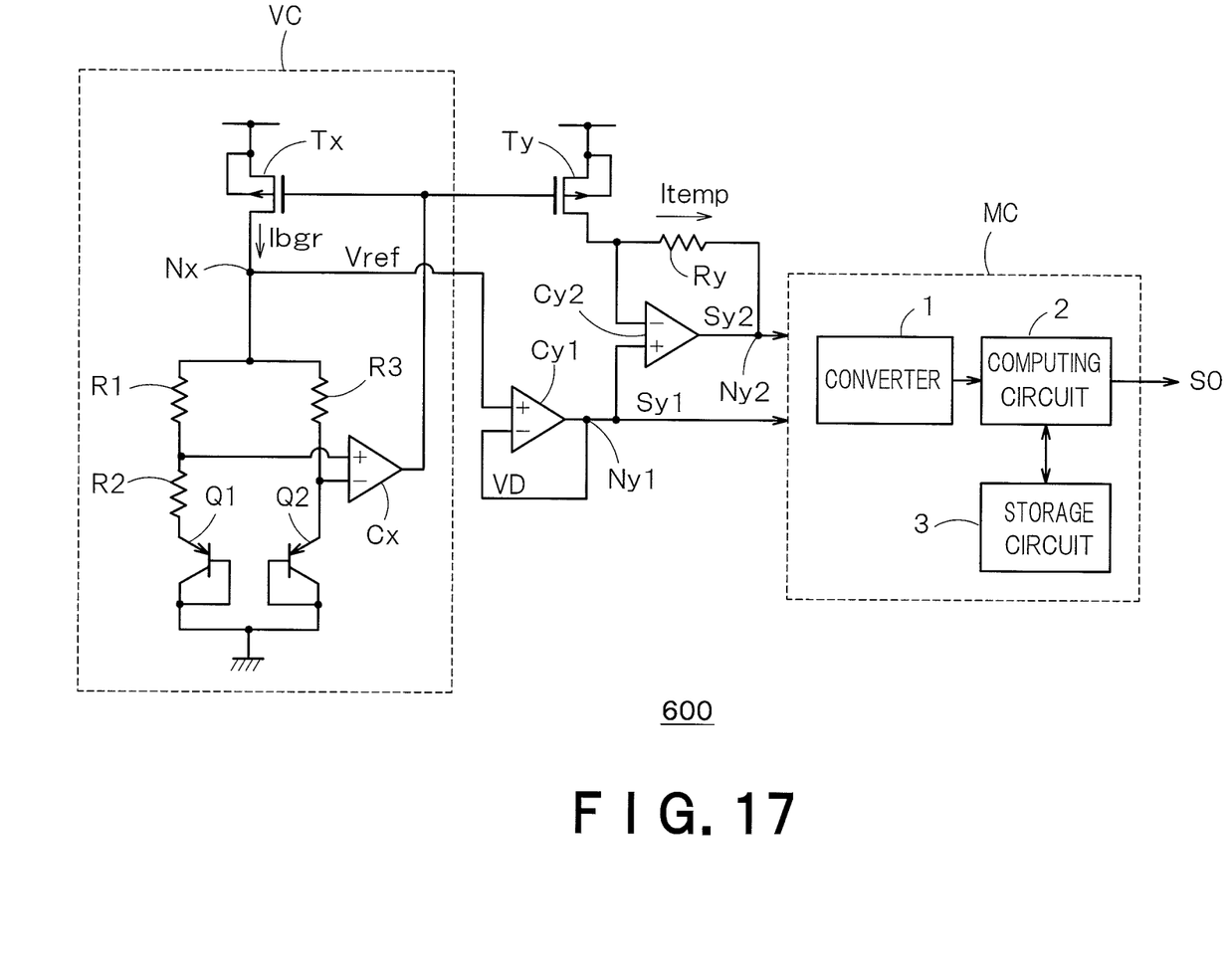
FIG. 17 is a circuit diagram showing an example of a configuration of a temperature sensor circuit 600 according to a sixth embodiment.
Figure 18:
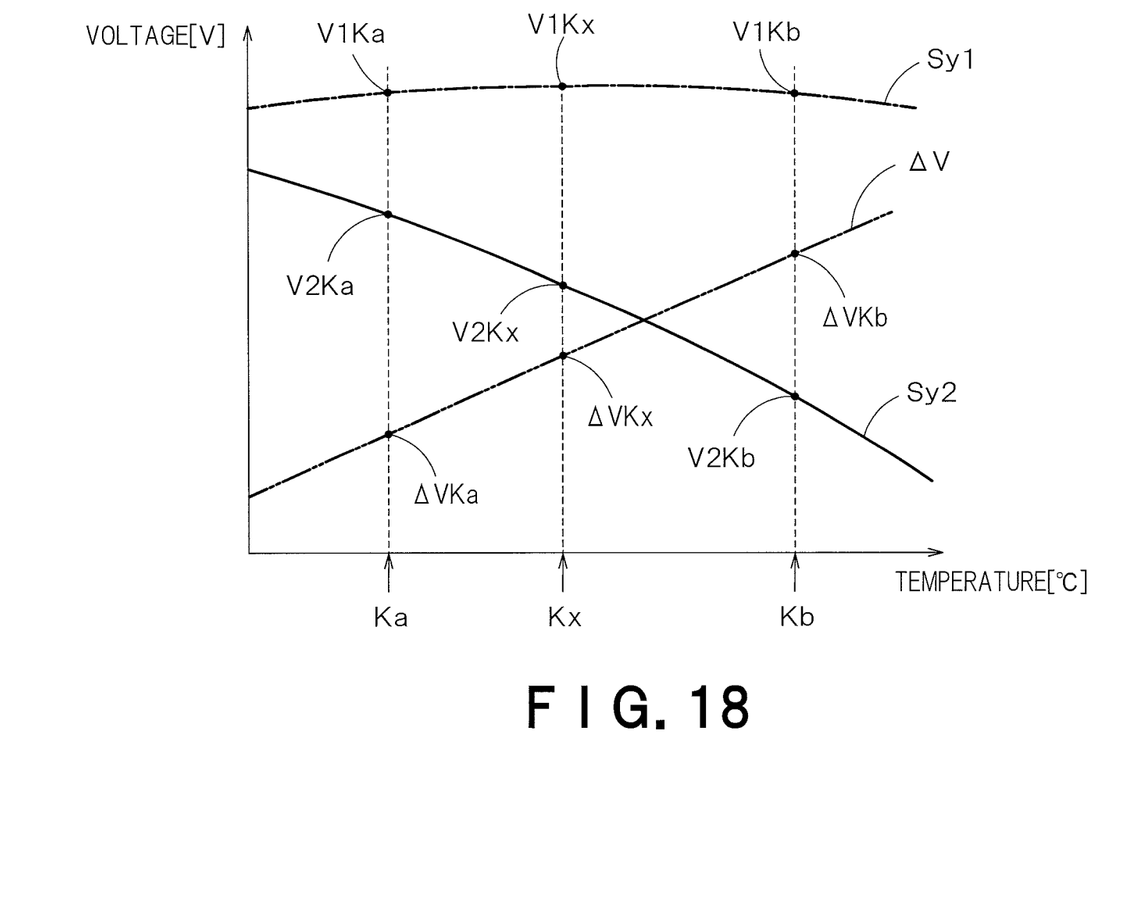
FIG. 18 is a diagram showing an example of a relationship between temperature and a first voltage, a second voltage and a differential voltage therebetween measured by the measuring circuit "MC" shown in FIG. 17.

FIG. 17 is a circuit diagram showing an example of a configuration of a temperature sensor circuit 600 according to a sixth embodiment. FIG. 18 is a diagram showing an example of a relationship between temperature and a first voltage, a second voltage and a differential voltage therebetween measured by the measuring circuit "MC" shown in FIG. 17. In FIG. 17, the same reference symbols as those in FIG. 9 denote the same components as those in the third embodiment, and description of the components will be omitted.

As shown in FIG. 17, the temperature sensor circuit 600 outputs the output signal "SO" that contains temperature information.

As with the temperature sensor circuit 300 according to the third embodiment, the temperature sensor circuit 600 includes the reference voltage circuit "VC", the first amplifying circuit "Cy1", the second amplifying circuit "Cy2", the measuring circuit "MC", the driving transistor "Ty", and the measuring resistor "Ry".

The measuring circuit "MC" includes a converter 1, a computing circuit 2 and a storage circuit 3.

The converter 1 converts the measured voltage from analog to digital and outputs the converted voltage to the computing circuit 2.

The storage circuit 3 stores, in advance, information on the first voltage and the second voltage measured at a first temperature and the first voltage and the second voltage measured at a second temperature different from the first temperature.

The computing circuit 2 reads the information stored in the storage circuit 3, computes the potential difference between the first voltage and the second voltage, and calculates an approximate linear expression of the potential difference between the first voltage and the second voltage based on the computation result.

An example of a specific operation of the measuring circuit "MC" will be described.

First, the converter 1 converts a measured first voltage "V1Kx" and a measured second voltage "V2Kx" from analog to digital, and outputs the converted voltages to the computing circuit 2 and the storage circuit 3.

As shown in FIG. 18, the storage circuit 3 stores information on a first voltage "V1Ka" and a second voltage "V2Ka" previously measured at a first temperature "Ka" and a first voltage "V1Kb" and a second voltage "V2Kb" previously measured at a second temperature "Kb".

Based on the information, the computing circuit 2 computes an approximate linear formula from a first potential difference "ΔVKa" between the first voltage "V1Ka" and the second voltage "V2Ka" measured at the first temperature "Ka" and a second potential difference "ΔVKb" between the first voltage "V1Kb" and the second voltage "V2Kb" measured at the second temperature "Kb".

In actual temperature measurement, the computing circuit 2 computes a third potential difference "ΔVKx" between the first voltage "V1Kx" and the second voltage "V2Kx" measured at a third temperature "Kx".

The computing circuit 2 computes the third temperature "Kx" that corresponds to the third potential difference "ΔVKx" according to the approximate linear formula, and outputs a signal that contains information on the third temperature "Kx" determined by the computation as the output signal "SO".

According to the method described above, temperature is calculated from the third potential difference "ΔKx" in the actual temperature measurement, so that an offset arising from variations or the like of the manufacturing process can be cancelled, and temperature can be more accurately detected.

The remainder of the configuration of the temperature sensor circuit 600 is the same as that of the temperature sensor circuit 300 shown in FIG. 9.

The operation of the temperature sensor circuit 600 configured as described above is the same as the operation of the temperature sensor circuit 300 according to the third embodiment.

That is, as with the temperature sensor circuit 300 according to the third embodiment, the temperature sensor circuit 600 according to the sixth embodiment can reduce the error of the temperature measurement.

The configuration of the measuring circuit of the temperature sensor circuit according to the sixth embodiment can be applied not only to temperature sensor circuit according to the third embodiment but also to the temperature sensor circuits according to the first, second, fourth and fifth embodiments.

While certain embodiments have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

What is claimed is:

1. An temperature sensor circuit, comprising:
   a reference voltage circuit that outputs a reference voltage;

a first amplifying circuit that receives the reference voltage at a first input end thereof, feeds a first signal back to a second input end thereof and outputs the first signal in such a manner as to make the first signal equal to the reference voltage;

a driving transistor that has a first end connected to a second potential and passes a predetermined current;

a measuring resistor that has a first end connected to a second end of the driving transistor;

a second amplifying circuit that receives the first signal at a first input end thereof, receives a voltage at the first end of the measuring resistor at a second input end thereof, is connected to a second end of the measuring resistor at an output end thereof and outputs a second signal so as to make the voltage at the first end of the measuring resistor equal to a voltage of the first signal; and a measuring circuit that calculates a voltage difference between the first signal and the second signal and outputs an output signal based on the result of the calculation, wherein the reference voltage circuit comprises:

a reference transistor that has a first end connected to a second potential and has a second end connected to a reference node at which the reference voltage is output;

a first reference resistor that has a first end connected to the reference node;

a second reference resistor that has a first end connected to a second end of the first reference resistor;

a third reference resistor that has a first end connected to the reference node;

a first reference diode that has an anode connected to a second end of the second reference resistor and has a cathode connected to a first potential;

a second reference diode that has an anode connected to a second end of the third reference resistor and has a cathode connected to the first potential; and a reference amplifying circuit that has a first input end connected to the second end of the first reference resistor and has a second input end to the second end of the third reference resistor, and controls the reference transistor so as to make a voltage at the second end of the first reference resistor and a voltage at the second end of the third reference resistor equal to each other.

2. The temperature sensor circuit according to claim 1, wherein the measuring resistor is a variable resistor.

3. The temperature sensor circuit according to claim 1, wherein the first and second reference diodes are
any of a diode-connected bipolar transistor, a diode-connected MOS transistor and a semiconductor element having a PN junction.

4. The temperature sensor circuit according to claim 1, wherein the measuring circuit compares the result of the calculation of the potential difference between the first signal and the second signal with a prescribed relationship between temperature and the potential difference between the first signal and the second signal to determine a temperature that corresponds to the measured potential difference, and outputs a signal containing information on the determined temperature as the output signal.

5. The temperature sensor circuit according to claim 1, wherein the measuring circuit comprises:

a storage circuit that stores information on the first signal and the second signal measured at a first temperature and on the first signal and the second signal measured at a second temperature different from the first temperature; and a computing circuit that reads the information from the storage circuit, computes the potential differences between the first signals and the second signals and outputs the output signal based on the result of the computation, and the computing circuit computes, based on the information, a first potential difference between the first signal and the second signal measured at the first temperature and a second potential difference between the first signal and the second signal measured at the second temperature, determines a linear function that defines a relationship between the measured temperature and the potential difference between the first signal and the second signal that corresponds to the measured temperature based on a relationship between the first temperature and the first potential difference and the second temperature and the second potential difference, computes a third potential difference between the first signal and the second signal measured at a third temperature, and computes a third temperature that corresponds to the third potential difference according to the linear function and outputs, as the output signal, a signal containing information on the third temperature determined by the computation.

6. The temperature sensor circuit according to claim 1, further comprising:

a voltage dividing circuit that is connected between an output end and the second input end of the first amplifying circuit;

wherein the voltage dividing circuit is connected to the output end of the first amplifying circuit at a first end thereof, to a first potential at a second end thereof and to the second input end of the first amplifying circuit at the output end thereof.

7. The temperature sensor circuit according to claim 6, wherein the voltage dividing circuit comprising:

a first voltage dividing resistor that is connected to the output end of the first amplifying circuit at a first end thereof and a voltage dividing node at which a dividing voltage is output at a second end thereof;

a second voltage dividing resistor that is connected to the voltage dividing node at a first end thereof and to the first potential at a second end thereof; and a voltage dividing ratio of the voltage dividing circuit is variable.

8. The temperature sensor circuit according to claim 2, wherein the measuring circuit compares the result of the calculation of the potential difference between the first signal and the second signal with a prescribed relationship between temperature and the potential difference between the first signal and the second signal to determine a temperature that corresponds to the measured potential difference, and outputs a signal containing information on the determined temperature as the output signal.

9. The temperature sensor circuit according to claim 2, wherein the measuring circuit comprises:

a storage circuit that stores information on the first signal and the second signal measured at a first temperature and on the first signal and the second signal measured at a second temperature different from the first temperature; and a computing circuit that reads the information from the storage circuit, computes the potential differences between the first signals and the second signals and outputs the output signal based on the result of the computation, and the computing circuit computes, based on the information, a first potential difference between the first signal and the second signal measured at the first temperature and a second potential difference between the first signal and the second signal measured at the second temperature, determines a linear function that defines a relationship between the measured temperature and the potential difference between the first signal and the second signal that corresponds to the measured temperature based on a relationship between the first temperature and the first potential difference and the second temperature and the second potential difference, computes a third potential difference between the first signal and the second signal measured at a third temperature, and computes a third temperature that corresponds to the third potential difference according to the linear function and outputs, as the output signal, a signal containing information on the third temperature determined by the computation.

* * * * *